United States Patent
Jovick

[11] 3,934,685
[45] Jan. 27, 1976

[54] WHEEL SPEED SENSOR ASSEMBLY

[75] Inventor: Raymond John Jovick, Troy, Mich.

[73] Assignee: Rockwell International Corporation, Pittsburgh, Pa.

[22] Filed: Nov. 4, 1974

[21] Appl. No.: 520,283

[52] U.S. Cl. ............................. 188/181 R; 310/168
[51] Int. Cl.² .......................................... B60T 8/12
[58] Field of Search ............ 188/180, 181 A, 181 R; 303/21 CF, 21 CG; 310/168, 171; 324/162; 340/262, 263

[56] References Cited
UNITED STATES PATENTS

| | | | |
|---|---|---|---|
| 3,473,120 | 10/1969 | Ruof ...................... | 188/181 A UX |
| 3,651,901 | 3/1972 | Burckhardt et al. ............ | 188/181 A |
| 3,828,150 | 8/1974 | Hubbard et al. ............ | 188/181 R X |

*Primary Examiner*—Duane A. Reger

[57] ABSTRACT

An improved wheel speed sensor assembly for installation in association with a wheel rotatably mounted on a hollow axle which has an open-ended spindle is of a type which includes an excitor ring mounted within a hub cap of the wheel and a magnetic sensor device capable of electrically transmitting a speed signal through electrical wiring extending through the interior of the axle. The improvement includes the sensor device being disposed within a sensor housing which is, in turn, disposed within the hub cap and mounted thereon for relative rotation about a central axis of hub cap with the sensor device in alignment with the excitor ring. The sensor housing has a connector portion generally extending toward and aligned with the open-ended spindle and electrically coupled to the wiring when the hub cap is secured on the wheel. A friction and sealing member between the spindle and the sensor housing prevents relative rotation of the spindle and the sensor housing prevents lubricating fluid within the hub cap from entering the hollow axle through the open-ended spindle during operation of the assembly.

10 Claims, 3 Drawing Figures

WHEEL SPEED SENSOR ASSEMBLY

Background of the Invention

1. Field of the Invention.

This invention relates to an improved wheel speed sensor and, more specifically, to such a sensor installed at the wheel of tractor trailer and utilized in an anti-skid braking system.

2. Description of the Prior Art.

It has been found desirable in the operation of an anti-skid braking system to provide an input representing the wheel speed. The wheel speed input is usually in the form of electrical signals indicative of the angular velocity of the wheel. These signals are generally derived from an electromagnetic sensor, including a magnet carried by a stationary portion of the trailer such as the axle spindle and a toothed or notched metal ring which rotates with the wheel relative the magnet. As the ring teeth pass the magnetic sensor, the resulting variations in flux produce a signal, the frequency of which is a function of the angular velocity of the wheel.

Because of the free-wheeling aspect of trailer wheels and the fixed mounting of the trailer axles upon which they are rotatably mounted, most trailer wheel speed sensors heretofore provided have been rigidly mounted at the open end of the spindle of the axle so that the sensor connecting wire can extend axially within the hollow interior of the axle. The wire exits the interior of the axle at a intermediate region remote from the wheel to be connected to the anti-skid braking system. Since the sensor extends from the end of the spindle, the notched ring is accordingly mounted within the hub cap rather than within the wheel housing so that only the cap need be removed to allow access to the sensor.

However, the easy accessibility offered by the prior art sensing means increases the likelihood of accidental damage to the sensor when the hub cap is removed. The exposed, unprotected sensor might be broken or otherwise rendered inoperative by physical contact during normal axle maintenance, such as during the removal of the wheel housing.

Further, since the gap between the sensor and the ring must be of a predetermined value and constantly maintained throughout wheel rotation, the configuration utilized in these prior art devices requires the manufacturing tolerances of the spindle and hub cap to be well-defined and maintained. Satisfying these tolerance requirements has increased the cost of manufacturing.

It is, therefore, of concern that the configuration heretofore employed in these prior art trailer wheel speed sensing devices has increased the cost of manufacturing the axle assembly and is susceptible to being accidentally damaged during normal axle maintenance.

SUMMARY OF THE INVENTION

It is therefore an object of the present invention to provide a trailer wheel speed sensor configuration in which the components will be protected from accidental damage during maintenance.

It is a further object to provide a speed sensor configuration of the type described which can be easily installed at the end of a trailer axle requiring less rigid tolerances during its manufacture.

To accomplish these and other objects of the invention, a preferred embodiment thereof includes an improved wheel speed sensor assembly for installation in association with a wheel rotatably mounted on a hollow axle which has an open-ended spindle. The assembly is of a type which includes an excitor ring mounted within a hub cap of the wheel and a magnetic sensor device capable of electrically transmitting a speed signal through electrical wiring extending through the interior of the axle.

The improvement includes the sensor device being disposed within a sensor housing which is disposed within the hub cap and mounted thereon for relative rotation about a central axis of the hub cap with the sensor device in alignment with the excitor ring.

The sensor housing has a connector portion generally extending toward and aligned with the open-ended spindle and electrically coupled to the wiring when the hub cap is secured on the wheel. The improvement further includes means disposed between the spindle and the sensor housing for providing friction contact therebetween to prevent relative rotation of the spindle and the sensor housing during operation of said assembly and for preventing lubricating fluid within the hub cap from entering the hollow axle through the open-ended spindle.

DETAILED DESCRIPTION OF THE PREFERRED EMBODIMENTS

Figure 1:
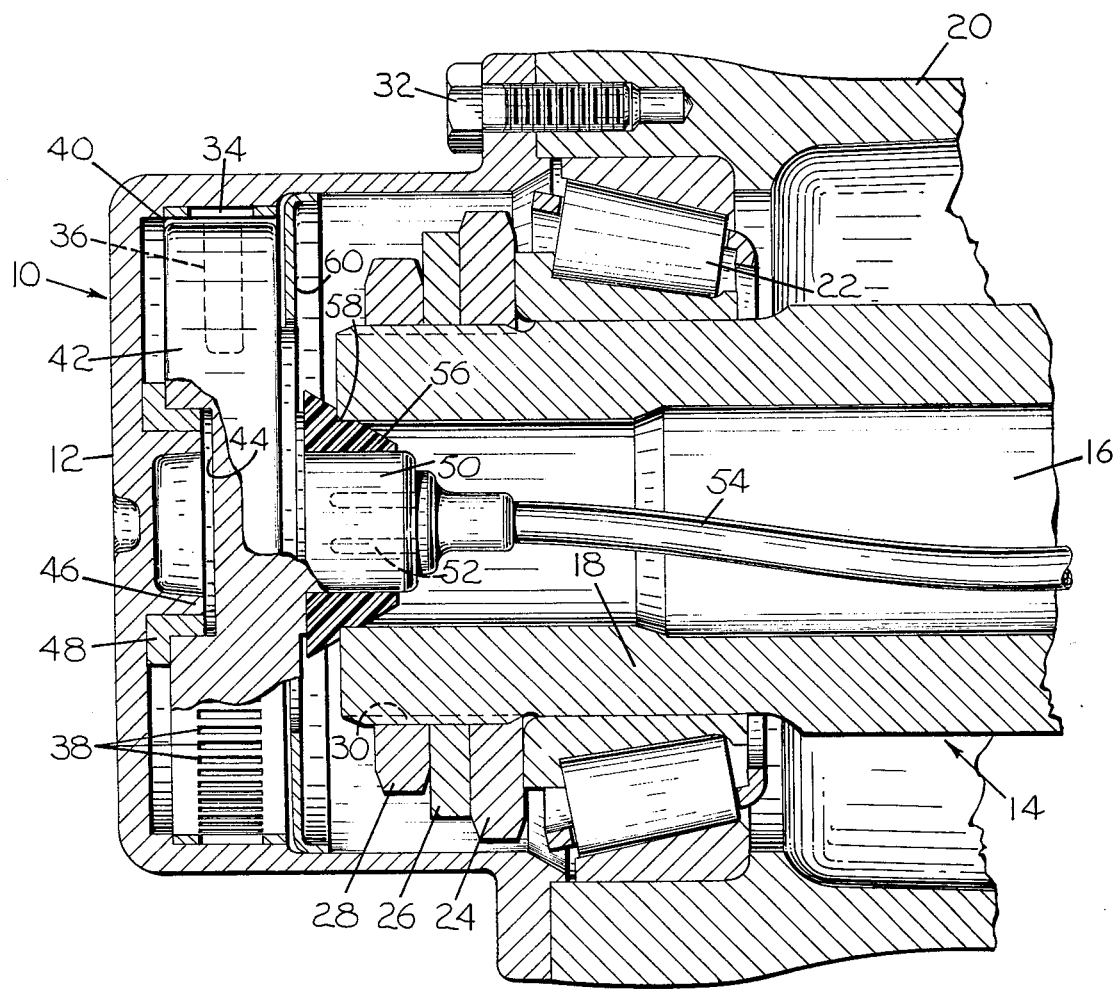
FIG. 1 is a sectional side view of the preferred configuration of the trailer axle speed sensor partially fragmented to include various features of the invention.

As seen in FIG. 1, the preferred wheel speed sensor configuration 10 is mounted within the hub cap 12 of a trailer axle 14. The axle 14 includes a hollow interior 16 and an open-ended spindle 18. The spindle 18 is adapted to receive a wheel hub 20 and associated tapered roller bearing 22. The hub 20 and bearing 22 are retained on the spindle 18 by a bearing adjusting nut 24, lock ring 26, and jam nut 28 on its threaded end 30.

As in the normal trailer axle installation, the wheel hub 20 is protected from accidental removal from the axle 14 by the hub cap 12 being bolted at 32 to the hub 20 to cover the retaining members 24, 26, 28. However, the preferred hub cap 12 includes both the excitor ring 34 and the sensor device 36 rather than their being mounted respectively on the hub cap and spindle as was the case in the prior art devices. The preferred excitor ring 34 is secured to the interior of the hub cap 12, is formed from sheet steel and includes a plurality of slots 38 punched therethrough and in an evenly-spaced array around the ring 34. With the hub cap 12 made of aluminum, the slotted ring 34 alters the magnetic field at the sensor device 36 to indicate the wheel speed when there is relative motion between the ring 34 and the device 36. The space 40 between the device 36 and ring 34 is typically about .030 inches and must be accurately and evenly maintained throughout trailer operation for accurate braking control.

To accurately establish and maintain the space 40, the device 36 is mounted within a circular housing 42. The housing 42 includes a centrally located cavity 44 which encircles to receive therein an inwardly extending axle portion 46 of the hub cap 12. A radial and axial bearing member 48 having a low coefficient of sliding friction is secured to the axle portion 46 to insure the radial position of the housing 42 with respect to the ring 34 and to allow the hub cap 12 to axially locate the housing 42 with respect to the axle 14 as will be discussed hereinbelow. It will be obvious that the surface of the housing 42 and cavity 44 might additionally or alternatively be of a low-friction material with the primary object being to locate the housing 42 relative the hub cap 12 and to insure low-friction contact therebetween during their relative rotary movement. Further, it can be seen that the desired relative motion could also be provided if the housing had an axle portion and the hub cap had a cavity into which its axle portion could be positioned.

The housing 42 further includes a central connector portion 50 which extends inwardly of the open-ended spindle 18 when the hub cap is installed on the wheel hub 20. The connector portion 50 includes electrical coupling means 52 by which a wire 54 may be electrically connected, through wiring within the housing 42, to the sensor device 36 to provide power thereto and to receive the speed signal therefrom. The wire 54 extends through the interior 16 of the axle 14 and eventually to the anti-skid control system (not shown).

To generate the desired relative motion between the ring 34 and the sensor device 36, it is essential to provide a means for preventing relative rotational motion between the sensor device 36 and the axle 14 as the ring 34 rotates with the hub cap 12 and wheel hub 20. In the preferred speed sensor configuration 10, a conical ring 56 encircles the connector portion 50 and is secured thereto. The conical ring 56 is made of a low durometer rubber and accordingly has a surface with a high coefficient of friction and is capable of resilient deformation. As seen in FIG. 1, the dimensions of the conical ring 56 are such that installing the hub cap 12 on the wheel hub 20 forces the conical ring toward the opening in the end of the spindle 18. When fully installed, the inner edge 58 of the spindle 18 depresses the conical ring 58 to generate sufficient frictional forces therebetween to effectively couple the housing 42 and sensor 36 to the axle 14 to insure the desired relative rotation between the ring 34 and sensor device 36 during operation.

It should be apparent that the significant tolerance requirements are now limited to the hub cap 12 and housing 42. The dimensions of the conical ring 56 are predetermined to insure depressed contact with the entire edge 58 of the spindle 18 which may have less rigid manufacturing tolerances. Further, the dimensions would also be sufficient to accommodate reasonable misalignment between the central axis of the hub cap 12 and the central axis of the axle 14. Therefore, even if the housing 42 to remain aligned with the hub cap 12 is required to wobble within the open end of the spindle 18, it will be prevented from rotating by the conical ring 56.

As stated hereinabove, the conical ring 56 must make contact with the entire edge 58 throughout operation. Although this would not appear necessary to insure ample friction to prevent their relative rotation, the ring 56 also provides another function. To insure proper lubrication for the wheel bearing 22, the hub cap of a trailer axle is filled with oil. The conical ring 56 of the preferred sensor configuration 10 thus additionally provides a seal which prevents the escape of oil from the bearing 22 to the interior 16 of the axle 14.

As described hereinabove, the sensor configuration 10 will effectively satisfy the operational and manufacturing objectives. However, as previously stated, the preferred sensor configuration 10 is less susceptible to damage during wheel and axle maintenance. Therefore, to insure the housing 42 and sensor 36 remain within the protective cover of the hub cap 12 when it is removed from maintenance purposes, a retainer 60 is provided. The retainer 60 is press-fitted or otherwise secured to the interior of the hub cap 12 after the housing 42 is installed on the bearing 48. Although retention might be accomplished without full encirclement, the preferred retainer 60 also tends to prevent any foreign matter from entering between the ring 34 and housing 42 where it might damage the sensor device 36 when operation is restored.

To remove the hub cap 12, the bolts 32 are withdrawn from the hub 20 and the hub cap 12 is moved axially. The retainer 60 insures that the housing 42 also moves axially so that the connector portion 50 and wire 54 are withdrawn from the interior 16 of the axle 14. The wire 54 may then be disconnected to release the hub cap 12. During installation, the wire 54 is coupled to the connector portion 50 before the hub cap 12 is positioned to be bolted to the hub 20.

Figure 2:
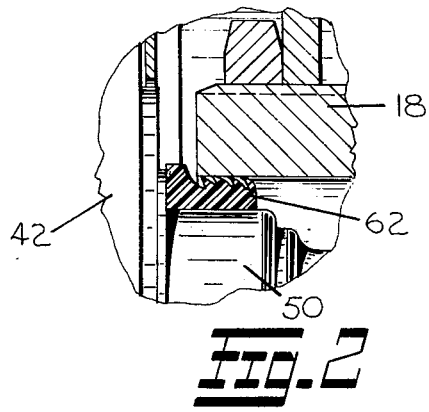
FIG. 2 is an enlarged partial view of the configuration of FIG. 1 showing an alternative embodiment.

As seen in FIG. 2, an alternative means for coupling the sensor housing 42 to the spindle 18 is shown in the form of a multiple-lip seal 62. This embodiment will provide the same function as the conical ring 56 described hereinabove. It, however, might be utilized in certain wheel and axle assemblies where there is substantial axial alignment of the hub cap and the axle but the longitudinal tolerances greatly vary. The seal 62 would be made of a higher durometer rubber and its deformation would be less while still providing adequate frictional contact.

Figure 3:
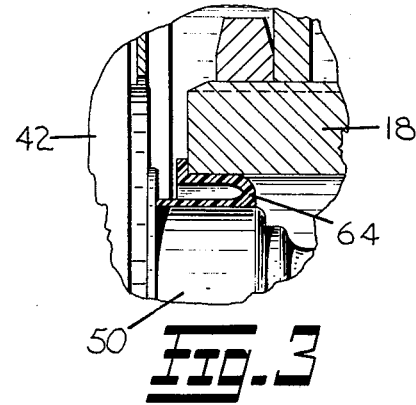
FIG. 3 is a view like that of FIG. 2 showing another alternative embodiment of the invention.

If in some assemblies the axial misalignment is found to be substantial, a drive and seal diaphragm 64, shown in FIG. 3, could alternatively be utilized. The diaphragm 64 would also be made of rubber and secured to the connector portion 50. Prior to insertion into the spindle 18, the diaphragm 64 would extend further to the right in an undeformed state. However, with insertion, the diaphragm 64 would be deformed to roll back over itself to provide substantial surface contact with the spindle 18 even if there were significant wobbling of the housing 42 within the spindle 18. Further, the oil pressure that existed within the hub cap would tend to increase the force on the diaphragm to increase the friction and to improve the seal.

The present invention is not limited to the preferred embodiments described hereinabove, but the disclosure provided will enable one to practice the invention by utilizing other means while nevertheless being within the scope of the invention as claimed. For example, the housing might be retained within the hub cap by a spring or clip device at the axle portion rather than with a retainer. Further, the resiliently deformable seal and friction member might be installed on the spindle rather than the housing or might be adapted to be removably positioned between the housing and the spindle with only frictional contact with both.

I claim:

1. An improved wheel speed sensor assembly for installation in association with a wheel rotatably mounted on a hollow axle which has an open-ended spindle and being of a type which includes an excitor ring mounted within a hub cap of said wheel and a magnetic sensor device capable of electrically transmitting a speed signal through electrical wiring extending through the interior of said axle; wherein the improvement comprises:

said sensor device being disposed within a sensor housing;

said sensor housing being disposed within said hub cap and mounted thereon for relative rotation about a central axis of said hub cap with said sensor device in alignment with said excitor ring;

said sensor housing having a connector portion generally extending toward and aligned with said open-ended spindle and electrically coupled to said wiring when said hub cap is secured on said wheel; and means disposed between said spindle and said sensor housing for providing frictional contact therebetween to prevent relative rotation of said spindle and said sensor housing during operation of said assembly.

2. An assembly as set forth in claim 1 further including means for preventing lubricating fluid within said hub cap from entering the interior of said hollow axle through said open-ended spindle.

3. An assembly as set forth in claim 1, wherein said means for providing frictional contact further prevents lubricating fluid within said hub cap from entering said hollow axle through said open-ended spindle.

4. An assembly as set forth in claim 3, wherein said means for providing frictional contact and for preventing lubricating fluid from entering said axle includes a resiliently deformable member encircling said connector portion and secured thereto.

5. An assembly as set forth in claim 4, wherein said member has an outer surface lying within a right conical surface.

6. An assembly as set forth in claim 4, wherein said member has a generally cylindrical outer surface including a multiplicity of alternating ridges and grooves extending around the circumference.

7. An assembly as set forth in claim 4, wherein said member is a diaphragm.

8. An improved sensor housing configuration for a magnetic sensor device which is of a type utilized in a wheel speed sensor assembly for installation in association with a wheel rotatably mounted on a hollow axle which has an open-ended spindle which assembly also includes an excitor ring mounted within a hub cap of said wheel so that said sensor device is capable of electrically transmitting a speed signal through electrical wiring extending through the interior of said axle; wherein the improvement comprises:

a sensor housing being disposable within said hub capable and mountable thereon for relative rotation about a central axis of said hub cap with said sensor device in alignment with said excitor ring, said sensor housing having a connector portion extendable toward and alignable with said open-ended spindle and capable of being electrically coupled to said wiring when said hub cap is secured on said wheel; and means capable of being disposed between said spindle and said sensor housing for providing frictional contact therebetween to prevent relative rotation of said spindle and said sensor housing during operation of said assembly.

9. A configuration as set forth in claim 8, wherein said means for providing frictional contact is further capable of preventing lubricating fluid within said hub cap from entering said hollow axle through said open-ended spindle.

10. A configuration as set forth in claim 8 further including means capable of being disposed between said spindle and said sensor housing for preventing lubricating fluid within said hub cap from entering said hollow axle through said open-ended spindle.

* * * * *